United States Patent
Oshima et al.

(10) Patent No.: US 12,500,317 B2
(45) Date of Patent: Dec. 16, 2025

(54) SOLID-STATE BATTERY (71) Applicant: Murata Manufacturing Co., Ltd., Nagaokakyo (JP)

(72) Inventors: Kenji Oshima, Nagaokakyo (JP); Makoto Yoshioka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 597 days.

(21) Appl. No.: 17/952,590

(22) Filed: Sep. 26, 2022

(65) Prior Publication Data
US 2023/0019426 A1 Jan. 19, 2023

Related U.S. Application Data (63) Continuation of application No. PCT/JP2021/014667, filed on Apr. 6, 2021.

(30) Foreign Application Priority Data

Apr. 7, 2020 (JP) ................... 2020-069177

(51) Int. Cl.
*H01M 50/593* (2021.01)
*H01M 10/0525* (2010.01)
(Continued)

(52) U.S. Cl.
CPC ..... *H01M 50/593* (2021.01); *H01M 10/0525* (2013.01); *H01M 10/0585* (2013.01); *H01M 50/586* (2021.01)

(58) Field of Classification Search
CPC ............. H01M 50/586; H01M 50/593; H01M 10/0525; H01M 10/0585
(Continued)

(56) References Cited

U.S. PATENT DOCUMENTS

| 2007/0259271 | A1 | 11/2007 | Nanno et al. |
| 2019/0131603 | A1 | 5/2019 | Park et al. |
| 2021/0135276 | A1 | 5/2021 | Sugiyo et al. |

FOREIGN PATENT DOCUMENTS

| CN | 107180995 A | * | 9/2017 | .......... H01M 50/572 |
| JP | 2007005279 A | | 1/2007 | |

(Continued)

OTHER PUBLICATIONS

Machine translation of CN 107180995 A (Year: 2017).*
International Search Report in PCT/JP2021/014667, mailed Jun. 22, 2021, 3 pages.

*Primary Examiner* — Kevin P Kerns
(74) *Attorney, Agent, or Firm* — ArentFox Schiff LLP (57) ABSTRACT

A solid-state battery that includes at least one battery constituent unit including a positive electrode layer, a negative electrode layer, and a solid electrolyte layer interposed between the positive electrode layer and the negative electrode layer, wherein each of the positive electrode layer and the negative electrode layer includes a side part having a terminal connection part and a terminal non-connection part; and an insulating part or a solid electrolyte part surrounding at least a part of the terminal non-connection part of at least one of the positive electrode layer and the negative electrode layer in a planar view of the at least one battery constituent unit such that the insulating part or the solid electrolyte part is in direct contact with the terminal non-connection part in a contact region and out of direct contact with the terminal non-connection part in a non-contact region.

16 Claims, 6 Drawing Sheets (51) Int. Cl.
*H01M 10/0585* (2010.01)
*H01M 50/586* (2021.01)

(58) Field of Classification Search
USPC .................................................. 429/161, 312
See application file for complete search history.

(56) References Cited

FOREIGN PATENT DOCUMENTS

| | | | |
|---|---|---|---|
| JP | 2007273349 | A | 10/2007 |
| JP | 2012226862 | A | 11/2012 |
| JP | 2015076178 | A | 4/2015 |
| JP | 2019021428 | A | 2/2019 |

\* cited by examiner

FIG. 7 - PRIOR ART (WHEN NOT IN USE)

(WHEN CHARGED)

SOLID-STATE BATTERY

CROSS REFERENCE TO RELATED APPLICATIONS

The present application is a continuation of International application No. PCT/JP2021/014667, filed Apr. 6, 2021, which claims priority to Japanese Patent Application No. 2020-069177, filed Apr. 7, 2020, the entire contents of each of which are incorporated herein by reference.

FIELD OF THE INVENTION

The present invention relates to a solid-state battery.

BACKGROUND OF THE INVENTION

Conventionally, secondary batteries that can be repeatedly charged and discharged have been used for various applications. For example, the secondary batteries are used as power supplies for electronic devices such as smartphones or laptop computers.

In these secondary batteries, liquid electrolytes (electrolytic solutions) such as an organic solvent have been conventionally used as media for moving ions. The secondary batteries that use electrolytic solutions, however, have problems such as leakages of the electrolytic solutions. Thus, the development of solid-state batteries including solid electrolytes instead of liquid electrolytes have been advanced.

Patent Document 1: Japanese Patent Application Laid-Open No. 2007-5279

SUMMARY OF THE INVENTION

Figure 4:
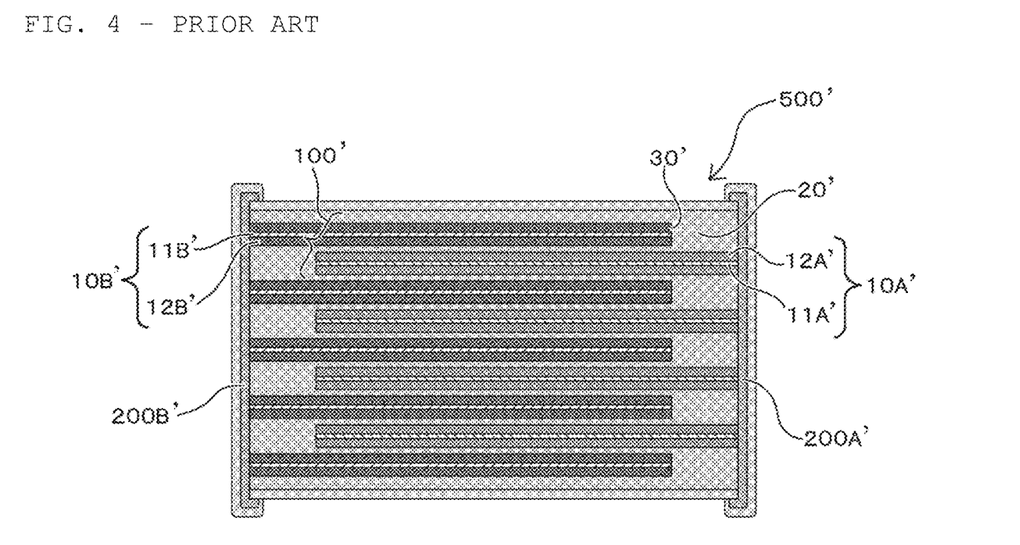
FIG. 4 is a sectional view schematically illustrating a conventional solid-state battery.

The solid-state battery 500' has a configuration in which at least one battery constituent unit 100' including a positive electrode layer 10A' and a negative electrode layer 10B' facing each other, and a solid electrolyte layer 20' interposed between the positive electrode layer 10A' and the negative electrode layer 10B' is provided in the laminating direction (see FIG. 4).

The positive electrode layer 10A' is composed of a positive electrode current collector 11A' and a positive electrode active material layer 12A', and configured such that one end of the positive electrode current collector 11A' is electrically connected to a positive electrode terminal 200A'. The negative electrode layer 10B' is composed of a negative electrode current collector 11B' and a negative electrode active material layer 12B', and configured such that one end of the negative electrode current collector 11B' is electrically connected to a negative electrode terminal 200B'. In such a configuration, a solid electrolyte layer 20' may be provided without any gap between the positive electrode layer 10A' and negative electrode layer 10B' facing each other, and provided so as to be brought into contact with a side part 30' (excluding the terminal connection part) of each electrode layer (see FIG. 4).

Figure 5:
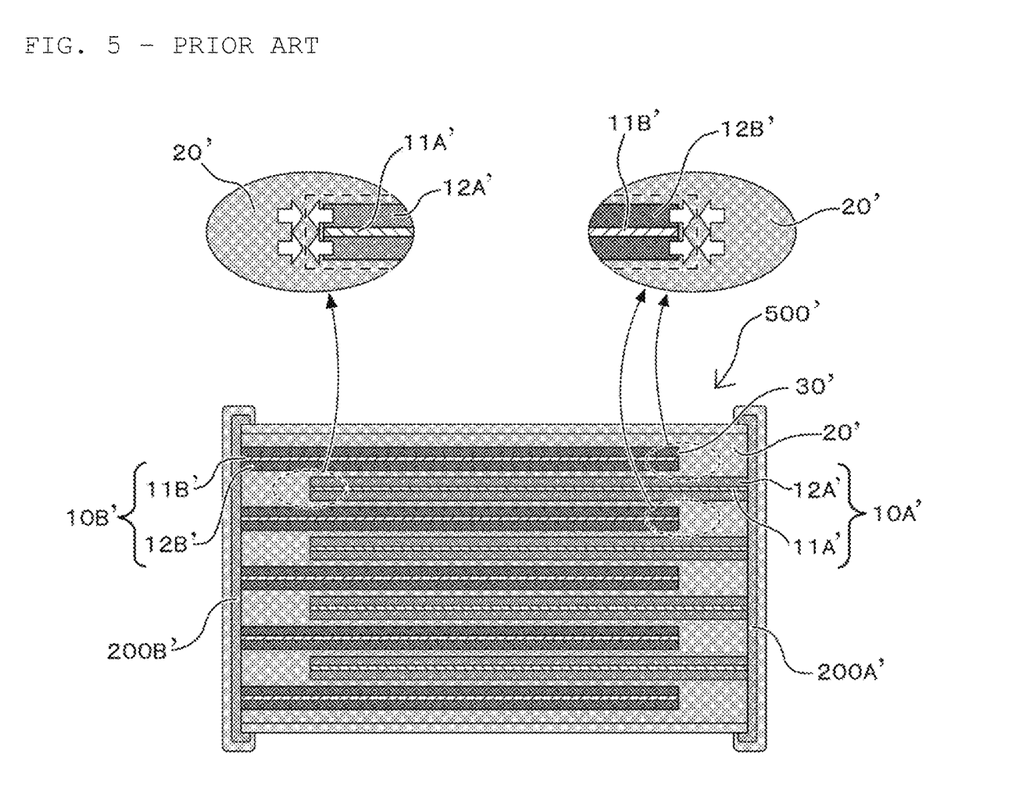
FIG. 5 is a sectional view schematically illustrating a conventional solid-state battery including an active material layer that expands at the time of charge.

In this regard, it is known by those skilled in the art that the active material layer of each electrode layer can expand due to the active material as a constituent element of the active material layer, with the movement of ions through the solid electrolyte between the positive electrode layer 10A' and the negative electrode layer 10B' at the time of charging the solid-state battery 500' (see FIG. 5). When such an expansion of the active material layer is caused, the following problems may can be caused.

Figure 6:
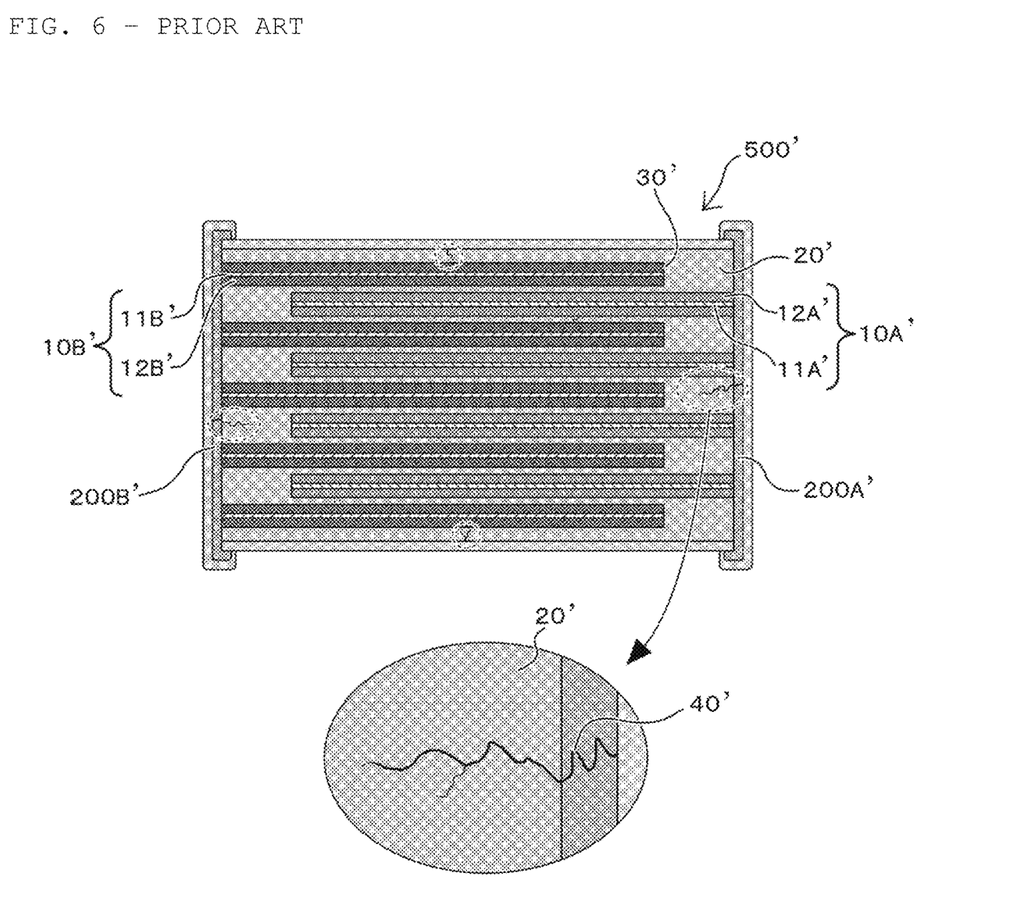
FIG. 6 is a sectional view schematically illustrating a conventional solid-state battery including a solid electrolyte layer cracked at the time of charge.
Figure 7:
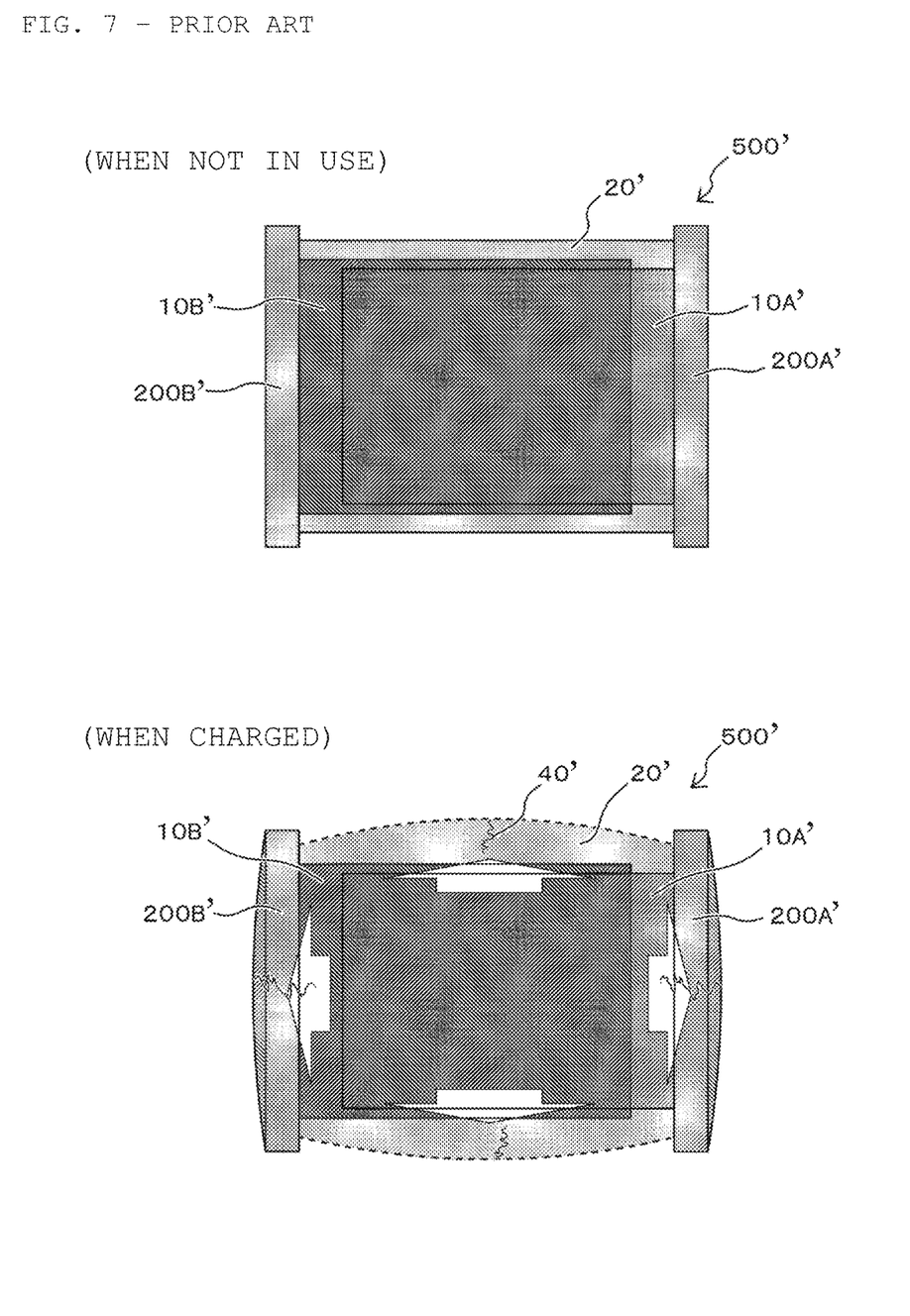
FIG. 7 is a plan view schematically illustrating a conventional solid-state battery including a solid electrolyte layer cracked at the time of charge.

Specifically, when the active material layer expands at the time of charging the solid-state battery 500', the solid electrolyte layer 20' in contact with the side part 30'(excluding the terminal connection part) of each electrode layer is low in degree of expansion. Thus, between the side part 30' (excluding the terminal connection part) of each electrode layer and the solid electrolyte layer 20', stress due to the expansion of the active material layer can be generated on the solid electrolyte layer 20' with the low degree of expansion. When such stress is generated, there is a possibility that due to the stress, a crack 40' may be generated at the peripheral edge of the solid-state battery 500', specifically, the peripheral edge of the solid electrolyte layer 20' (see FIGS. 6 and 7). The generation of such a crack 40' may cause the intrusion of moisture or the like from the outside into the electrode layers and the solid electrolyte in the solid-state battery 500', thereby causing the battery to be deteriorated. Accordingly, it can be difficult to suitably charge and discharge the solid-state battery 500'.

The present invention has been made in view of the circumstances mentioned above. More specifically, a main object of the present invention is to provide a solid-state battery capable of suitably keeping cracks from being generated at the time of charging the solid-state battery.

For achieving the object mentioned above, an embodiment of the present invention provides: a solid-state battery including at least one battery constituent unit including a positive electrode layer, a negative electrode layer, and a solid electrolyte layer interposed between the positive electrode layer and the negative electrode layer, where each of the positive electrode layer and the negative electrode layer includes at least an active material layer, and includes a side part having a terminal connection part and a terminal non-connection part; and an insulating part or a solid electrolyte part surrounding at least a part of the terminal non-connection part of at least one of the positive electrode layer and the negative electrode layer in a planar view of the at least one battery constituent unit in a laminating direction of the positive electrode layer, a negative electrode layer, and a solid electrolyte layer such that the insulating part or the solid electrolyte part is in direct contact with the terminal non-connection part in a contact region and out of direct contact with the terminal non-connection part in a non-contact region.

According to an embodiment of the present invention, cracks can be suitably kept from being generated at the time of charging the solid-state battery.

DETAILED DESCRIPTION OF THE INVENTION

Before describing a solid-state battery according to an embodiment of the present invention, the basic configuration of the solid-state battery will be described. The term "solid-state battery" as used herein refers in a broad sense to a battery that has constituent elements composed of solids, and in a narrow sense to an all-solid-state battery that has constituent elements (in particular, all constituent elements) composed of solids. In a preferred aspect, a solid-state battery according to the present invention is a laminated-type solid battery configured such that layers constituting a battery constituent unit are laminated on each other, and preferably, such layers are each composed of a fired body. The "solid-state battery" as used herein can encompass not only a secondary battery that can be repeatedly charged and discharged, but also a primary battery that can be only discharged. In a preferred aspect of the present invention, the solid-state battery is a secondary battery. The "secondary battery" is not to be considered unduly restricted by the name of the secondary battery, which can encompass, for example, an electric storage device and the like.

The term "sectional view" as used herein refers to a solid-state battery as viewed from a direction substantially perpendicular to a thickness direction based on the laminating direction of active material layers constituting the solid-state battery. The "vertical direction" and "horizontal direction" used directly or indirectly in this specification respectively correspond to the vertical direction and horizontal direction in the drawings. Unless otherwise specified, the same symbols or marks shall denote the same members or the same meanings. In a preferred aspect, it can be understood that the downward direction in the vertical direction (that is, the direction in which gravity acts) corresponds to a "downward direction", and the opposite direction corresponds to an "upward direction".

The various numerical ranges mentioned herein are intended to include the lower and upper numerical values themselves, unless otherwise stated. More specifically, for example, to take a numerical range such as 1 to 10 as an example, unless otherwise stated, the range can be construed as including not only the lower limit of "1" but also the upper limit of "10".

[Configuration of Solid-State Battery]

The solid-state battery includes at least electrode layers of a positive electrode and a negative electrode, and a solid electrolyte. Specifically, the solid-state battery includes a battery element including a battery constituent unit including a positive electrode layer, a negative electrode layer, and a solid electrolyte interposed therebetween.

For the solid-state battery, each layer constituting the solid-state battery is formed by firing, and the positive electrode layer, the negative electrode layer, the solid electrolyte, and the like form a sintered layer. Preferably, the positive electrode layer, the negative electrode layer, and the solid electrolyte are integrally fired with each other, and thus, the battery element forms an integrally sintered body.

The positive electrode layer is an electrode layer containing at least a positive electrode active material. The positive electrode layer may further contain a solid electrolyte. For example, the positive electrode layer is composed of a sintered body including at least positive electrode active material particles and solid electrolyte particles. In a preferred aspect, the positive electrode layer is composed of a sintered body substantially including only positive electrode active material particles and solid electrolyte particles. In contrast, the negative electrode layer is an electrode layer containing at least a negative electrode active material. The negative electrode layer may further contain a solid electrolyte. For example, the negative electrode layer is composed of a sintered body including at least negative electrode active material particles and solid electrolyte particles. In a preferred aspect, the negative electrode layer is composed of a sintered body substantially including only negative electrode active material particles and solid electrolyte particles.

The positive electrode active material and the negative electrode active material are substances involved in the transfer of electrons in the solid-state battery. The movement (conduction) of ions between the positive electrode layer and the negative electrode layer through the solid electrolyte leads to the transfer of electrons for charging and discharging. The positive electrode layer and the negative electrode layer are preferably layers capable of occluding and releasing lithium ions or sodium ions, in particular. More specifically, the solid-state battery is preferably an all solid-state secondary battery configured to be charged and discharged by the movement of lithium ions between the positive electrode layer and the negative electrode layer through the solid electrolyte.

(Positive Electrode Active Material)

Examples of the positive electrode active material included in the positive electrode layer include at least one selected from the group consisting of lithium-containing phosphate compounds that have a NASICON-type structure, lithium-containing phosphate compounds that have an olivine-type structure, lithium-containing layered oxides, and lithium-containing oxides that have a spinel-type structure. Examples of the lithium-containing phosphate compounds that have a NASICON-type structure include $Li_3V_2(PO_4)_3$. Examples of the lithium-containing phosphate compounds that have an olivine-type structure include $Li_3Fe_2(PO_4)_3$, $LiFePO_4$, and/or $LiMnPO_4$. Examples of the lithium-containing layered oxides include $LiCoO_2$ and/or $LiCo_{1/3}Ni_{1/3}Mn_{1/3}O_2$. Examples of the lithium-containing oxides that have a spinel-type structure include $LiMn_2O_4$ and/or $LiNi_{0.5}Mn_{1.5}O_4$.

In addition, examples of positive electrode active material capable of occluding and releasing sodium ions include at least one selected from the group consisting of sodium-containing phosphate compounds that have a NASICON-type structure, sodium-containing phosphate compounds that have an olivine-type structure, sodium-containing layered oxides, and sodium-containing oxides that have a spinel-type structure.

(Negative Electrode Active Material)

Specific examples of the negative electrode active material included in the negative electrode layer include at least one selected from the group consisting of oxides containing at least one element selected from the group consisting of Ti, Si, Sn, Cr, Fe, Nb, and Mo, graphite-lithium compounds, lithium alloys, lithium-containing phosphate compounds that have a NASICON-type structure, lithium-containing phosphate compounds that have an olivine-type structure, and lithium-containing oxides that have a spinel-type structure. Examples of the lithium alloys include Li—Al. Examples of the lithium-containing phosphate compounds that have a NASICON-type structure include $Li_3V_2(PO_4)_3$ and/or $LiTi_2(PO_4)_3$. Examples of the lithium-containing phosphate compounds that have an olivine-type structure include $Li_3Fe_2(PO_4)_3$ and/or $LiCuPO_4$. Examples of the lithium-containing oxides that have a spinel-type structure include $Li_4Ti_5O_{12}$.

In addition, examples of negative electrode active material capable of occluding and releasing sodium ions include at least one selected from the group consisting of sodium-containing phosphate compounds that have a NASICON-type structure, sodium-containing phosphate compounds that have an olivine-type structure, and sodium-containing oxides that have a spinel-type structure.

In the solid-state battery of the present invention according to a preferred aspect, the positive electrode layer and the negative electrode layer are made of the same material.

The positive electrode layer and/or the negative electrode layer may include a conductive material. Examples of the conductive material included in the positive electrode layer and the negative electrode layer include at least one of metal materials such as silver, palladium, gold, platinum, aluminum, copper, and nickel, and carbon. Although not particularly limited, carbon is preferred in that carbon hardly reacts with the positive electrode active material, the negative electrode active material, the solid electrolyte material, and the like, and produces the effect of reducing the internal resistance of the solid-state battery.

Further, the positive electrode layer and/or the negative electrode layer may include a sintering aid. Examples of the sintering aid include at least one selected from the group consisting of a lithium oxide, a sodium oxide, a potassium oxide, a boron oxide, a silicon oxide, a bismuth oxide, and a phosphorus oxide.

(Positive Electrode Current Collector/Negative Electrode Current Collector)

Although not an essential element for the electrode layer, the positive electrode layer and the negative electrode layer may respectively include a positive electrode current collector and a negative electrode current collector. The positive electrode current collector and the negative electrode current collector may each have the form of a foil, and may have the form of a fired body from viewpoints such as reducing the manufacturing cost of the solid-state battery by integral firing and reducing the internal resistance of the solid-state battery. As the positive electrode current collector constituting the positive electrode current collector and the negative electrode current collector constituting the negative electrode current collector, it is preferable to use a material with a high conductivity, and for example, it is preferable to use silver, palladium, gold, platinum, aluminum, copper, nickel, or the like. In particular, copper is preferred because copper hardly reacts with the positive electrode active material, the negative electrode active material, and the solid electrolyte material, and has the effect of reducing the internal resistance of the solid-state battery. The positive electrode current collector and the negative electrode current collector may each have an electrical connection for being electrically connected to the outside, and may be configured to be electrically connectable to a terminal. The positive electrode current collector and the negative electrode current collector may each have the form of a foil. From the viewpoints of improving the electron conductivity by integral firing and reducing the manufacturing cost, the positive electrode current collector and the negative electrode current collector preferably each have an integrally fired form. It is to be noted that when the positive electrode current collector and the negative electrode current collector have the form of a fired body, the positive electrode current collector and the negative electrode current collector may be composed of, for example, a sintered body including a conductive material and a sintering aid. The conductive material included in the positive electrode current collector and the negative electrode current collector may be selected from, for example, the same materials as the conductive materials, which can be included in the positive electrode layer and/or the negative electrode layer. The sintering aid included in the positive electrode current collector and the negative electrode current collector may be selected from, for example, the same materials as the sintering aids, which can be included in the positive electrode layer and/or the negative electrode layer.

The thicknesses of the positive electrode current collector and negative electrode current collector are not particularly limited, and may be, independently of each other, for example, 1 μm to 5 μm, particularly 1 μm to 3 μm.

The thicknesses of the positive electrode layer and negative electrode layer are not particularly limited, but may be, independently of each other, for example, 2 μm to 50 μm, particularly 5 μm to 30 μm.

(Solid Electrolyte)

The solid electrolyte is a material capable of lithium-ion conduction. In particular, the solid electrolyte constituting a battery constituent unit in the solid-state battery forms a layer capable of lithium-ion or sodium-ion conduction between the positive electrode layer and the negative electrode layer. It is to be noted that the solid electrolyte has only to be provided at least between the positive electrode layer and the negative electrode layer. More specifically, the solid electrolyte may be present around the positive electrode layer and/or the negative electrode layer so as to protrude from between the positive electrode layer and the negative electrode layer. Specific examples of the solid electrolyte include lithium-containing phosphate compounds that have a NASICON structure, oxides that have a perovskite structure, and oxides that have a garnet-type or garnet-type similar structure. The lithium-containing phosphate compounds that have a NASICON structure include $Li_xM_y(PO_4)_3$ ($1 \le x \le 2$, $1 \le y \le 2$, M represents at least one selected from the group consisting of Ti, Ge, Al, Ga, and Zr). Examples of the lithium-containing phosphate compounds that have a NASICON structure include $Li_{1.2}Al_{0.2}Ti_{1.8}(PO_4)_3$. Examples of the oxides that have a perovskite structure include $La_{0.55}Li_{0.35}TiO_3$. Examples of the oxides that have a garnet-type or garnet-type similar structure include $Li_7La_3Zr_2O_{12}$.

Further, examples of the solid electrolyte capable of sodium-ion conduction include sodium-containing phosphate compounds that have a NASICON structure, oxides that have a perovskite structure, and oxides that have a garnet-type or garnet-type similar structure. The preferably used lithium-containing phosphate compounds that have a NASICON structure include $Na_xM_y(PO_4)_3$ ($1 \le x \le 2$, $1 \le y \le 2$, M represents at least one selected from the group consisting of Ti, Ge, Al, Ga, and Zr).

The solid electrolyte may include a sintering aid. The sintering aid included in the solid electrolyte may be selected from, for example, the same materials as the sintering aids, which can be included in the positive electrode layer/the negative electrode layer.

The thickness of the solid electrolyte layer is not particularly limited, and may be, for example, 1 μm to 15 μm, particularly 1 μm to 5 μm.

(Terminal)

The solid-state battery is typically provided with a terminal (for example, an external electrode). In particular, side parts of the solid-state battery are provided with terminals. Specifically, the side parts of the solid-state battery are provided with a positive electrode-side terminal connected to the positive electrode layer and a negative electrode-side terminal connected to the negative electrode layer. The terminal of the positive electrode layer is joined to an end of the positive electrode layer, specifically, an extended part formed at the end of the positive electrode layer. In addition, the terminal of the negative electrode layer is joined to an end of the negative electrode layer, specifically, an extended part formed at the end of the negative electrode layer. In a preferred aspect, the terminals preferably contain glass or glass ceramics from the viewpoint of joining the terminals to the extended parts of the electrode layers. In addition, the terminals preferably contain a material with a high conductivity. The specific materials of the terminals are not particularly limited, but examples of the terminals include at least one selected from the group consisting of silver, gold, platinum, aluminum, copper, tin, and nickel.

(Exterior)

The exterior can be typically formed on the outermost side of the solid-state battery, and is intended for electrical, physical, and/or chemical protection. The material constituting the exterior is preferably excellent in insulation property, durability, and/or moisture resistance, and environmentally safe.

The exterior is a layer that covers the surface of the battery element such that the extended part of each electrode layer and each external electrode can be joined to each other. Specifically, the exterior covers the surface of the battery element such that the extended part of the positive electrode layer and the external electrode on the positive electrode side can be joined, and covers the surface of the battery element such that the extended part of the negative electrode layer and the external electrode on the negative electrode side can be joined. More specifically, the exterior covers, without covering the entire surface of the battery element without any gap, the battery element such that the extended parts of the electrode layers (the ends of the electrode layers) are exposed for joining the extended parts of the electrode layers of the battery element and the external electrodes.

[Feature of Solid-State Battery According to Present Invention]

In consideration of the basic configuration of the solid-state battery, a feature of a solid-state battery according to an embodiment of the present invention will be described below.

The inventors of the present application have intensively studied solutions for suitably suppressing cracks at the time of charging the solid-state battery. As a result, the inventors of the present application have devised the employment of an unprecedented characteristic configuration in the region of contact between a terminal non-connection part (excluding a terminal connection part) at a side part of the electrode layer and a solid electrolyte part or an insulating part surrounding the terminal non-connection part.

It is to be noted that the term "insulating part" as used herein refers to a part made of an insulating material and containing no active material, and is accordingly lower in the degree of expansion at the time of charging the solid-state battery than the active material (layer). The term "solid electrolyte part" as used herein refers to a part that is made of a solid electrolyte material and relatively low in active material content ratio, and is accordingly lower in the degree of expansion at the time of charging the solid-state battery than the active material (layer). The term "terminal connection part" as used herein refers to a part where the side part of the electrode layer is connected to the terminal. The term "terminal non-connection part" as used herein refers to a part where the side part of the electrode layer is not connected to the terminal.

Hereinafter, the configuration of a feature of a solid-state battery according to an embodiment of the present invention will be specifically described with reference to the drawings. It is to be noted that as will be described later, an embodiment of the present invention is based on the premise that at least parts of the terminal non-connection parts of the side parts of the positive electrode layer and negative electrode layer are surrounded by the insulating part or the solid electrolyte part in planar view. In this specification, "the side part of the electrode layer (positive electrode layer/negative electrode layer)" may correspond to the outer edge and/or the contour part of the electrode layer in planar view.

Figure 1:
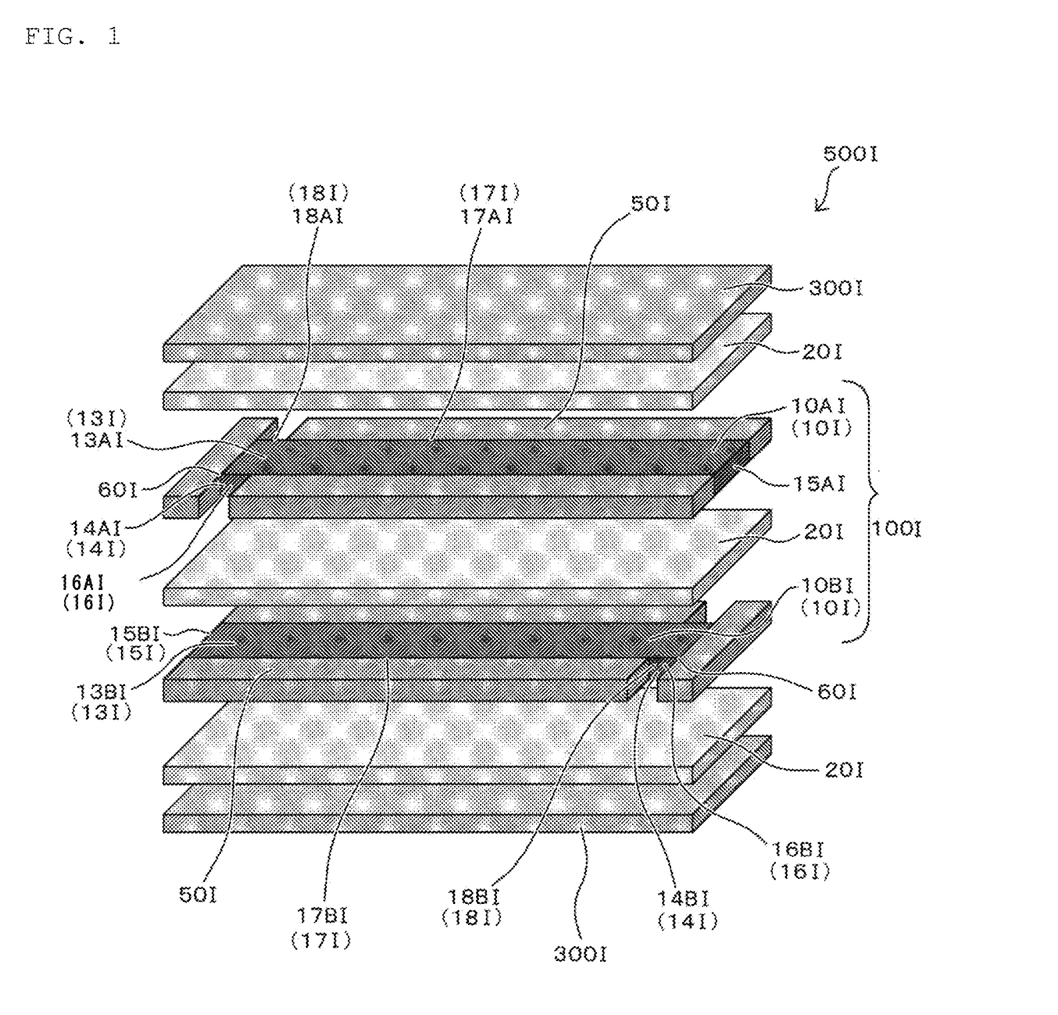
FIG. 1 is an exploded perspective view schematically illustrating a solid-state battery according to an embodiment of the present invention.

FIG. 1 is an exploded perspective view schematically illustrating a solid-state battery according to an embodiment of the present invention.

As shown in FIG. 1, a solid-state battery 500I according to an embodiment of the present invention includes, in the laminating direction, at least one battery constituent unit 100I including a positive electrode layer 10AI, a negative electrode layer 10BI, and a solid electrolyte layer 20I interposed between the positive electrode layer 10AI and the negative electrode layer 10BI. The positive electrode layer 10AI includes a positive electrode active material layer, and the negative electrode layer 10BI includes a negative electrode active material layer.

The positive electrode layer 10AI includes a main surface part (or main part) 13AI (13I) facing the solid electrolyte layer 20I in the laminating direction and a side part 14AI (14I) extending in a direction substantially perpendicular to the extending direction of the main surface part. The side part 14AI includes a terminal connection part 15AI (15I) and a terminal non-connection part 16AI (16I). The terminal connection part 15AI of the side part 14AI of the positive electrode layer 10AI is a part that can be directly connected to the positive electrode terminal. The terminal non-connection part 16AI of the side part 14AI of the positive electrode layer 10AI is a portion not connected to the positive electrode terminal.

The negative electrode layer 10BI includes a main surface part (or main part) 13BI (13I) facing the solid electrolyte layer 20I in the laminating direction and a side part 14BI (14I) extending in a direction substantially perpendicular to the extending direction of the main surface part. The side part 14BI includes a terminal connection part 15BI (15I) and a terminal non-connection part 16BI (16I). The terminal connection part 15BI of the side part 14BI of the negative electrode layer 10BI is a part that can be directly connected to the negative electrode terminal. The terminal non-connection part 16BI of the side part 14BI of the negative electrode layer 10BI is a portion not connected to the negative electrode terminal.

As described above, an embodiment of the present invention is based on the premise that at least parts of the terminal non-connection parts 16I of the side parts of the electrode layer (positive electrode layer/negative electrode layer) are surrounded by an insulating part or a solid electrolyte part 50I in planar view. Under such a premise, as viewed from the electrode layer 10I in the direction of the insulating part or the solid electrolyte part 50I, an embodiment of the present invention has a technical feature in that the terminal non-connection part 16I of at least one of the positive electrode layer 10AI and the negative electrode layer 10BI includes a contact region 17I in direct contact with the insulating part or the solid electrolyte part 50I and a non-contact region 18I out of direct contact with the insulating part or the solid electrolyte part 50I.

The phrase "at least a part of the terminal non-connection part is surrounded by the insulating part or the solid electrolyte part" as used herein refers to the insulating part or the solid electrolyte part surrounding all or a part of the terminal non-connection part on the premise that the terminal non-connection part of the side part of the electrode layer (positive electrode layer/negative electrode layer) includes a non-contact region out of direct contact with the insulating part or the solid electrolyte part in planar view. In addition, the term "contact region" as used in this specification refers to a region that is a constituent element of the terminal non-connection part of the side part of the electrode layer, in direct contact with a part of the insulating part or the solid electrolyte part located around the terminal non-connection part of the electrode layer in planar view. In addition, the term "non-contact region" as used in this specification refers to a region that is a constituent element of the terminal non-connection part of the side part of the electrode layer, out of direct contact with a part of the insulating part or the solid electrolyte part located around the terminal non-connection part of the electrode layer in planar view. More specifically, the "contact region" and the "non-contact region" are both not constituent elements of the terminal connection part of the side part of the electrode layer.

In the conventional configuration, the terminal non-connection part of the side part of the electrode layer is completely surrounded by the insulating part or the solid electrolyte part, with the terminal non-connection part in contact with the insulating part or the solid electrolyte part in planar view. More specifically, when the terminal non-connection part is completely surrounded by the insulating part or the solid electrolyte part, the terminal non-connection part is composed of only the contact region in direct contact with the insulating part or the solid electrolyte part.

In contrast, according to the technical feature of the present invention, the terminal non-connection part 16I of the side part 14I of the electrode layer 10I includes the non-contact region 18I out of direct contact with the insulating part or the solid electrolyte part 50I. Thus, the range of contact can be reduced between the terminal non-connection part 16I and the insulating part or solid electrolyte part 50I. Specifically, the range of contact can be reduced between the electrode layer 10I including the active material layer with a high degree of expansion and the insulating part or solid electrolyte part 50I with a low degree of expansion. Thus, it is possible to provide a site where stress can be generated on the insulating part or solid electrolyte part 50I with a low degree of expansion due to the active material layer with a high degree of expansion, and a site where the stress is not generated or hardly generated.

As a result, the extent in which stress can be generated on the insulating part or solid electrolyte part 50I with a low degree of expansion due to the active material layer with a high degree of expansion can be reduced as compared with the conventional configuration mentioned above. The reduced extent of stress generation can reduce, as a whole, alleviate stress itself that can be generated on the insulating part or solid electrolyte part 50I with a low degree of expansion due to the active material layer with a high degree of expansion, as compared with the conventional configuration mentioned above. Accordingly, the crack generation at the time of charging the solid-state battery 500I can be suitably suppressed.

It is to be noted that an embodiment of the present invention preferably employs the following aspect.

According to an aspect, a part of the terminal non-connection part 16I is preferably surrounded by the insulating part or the solid electrolyte part 50I in planar view (see FIG. 1).

The phrase "a part of the terminal non-connection part is surrounded by the insulating part or the solid electrolyte part" as used herein refers to the fact that, in planar view, the terminal non-connection part of the side part of the electrode layer (positive electrode layer/negative electrode layer) is not completely surrounded by the insulating part or the solid electrolyte part, that is, a part of the terminal non-connection part is not surrounded by the insulating part or the solid electrolyte part.

In this case, as shown in FIG. 1, in the non-contact region 18I of the terminal non-connection part 16I, a configuration can be provided with the terminal non-connection part 16I and the insulating part or the solid electrolyte part 50I out of direct contact with each other and out of facing each other. From another point of view, at least two insulating parts or solid electrolyte parts 50I separated from each other in planar view can employ a configuration of surrounding the terminal non-connection part 16I. More specifically, this means that the insulating part or solid electrolyte part 50I surrounding at least a part of the terminal non-connection part 16I is discontinuous in planar view.

According to the present aspect, in the non-contact region 18I of the terminal non-connection part 16I, the terminal non-connection part 16I and the insulating part or solid electrolyte part 50I have a configuration out of direct contact with each other and out of facing each other. Therefore, regardless of whether the electrode layer 10I is expanded between before and after charging the battery, the non-contact region 18I can be suitably kept from coming into contact with the insulating part or the solid electrolyte part 50I. Thus, it is possible to suitably provide a site where stress can be generated on the insulating part or solid electrolyte part 50I with a low degree of expansion due to the active material layer with a high degree of expansion, and a site where the stress is not generated or hardly generated.

Figure 2:
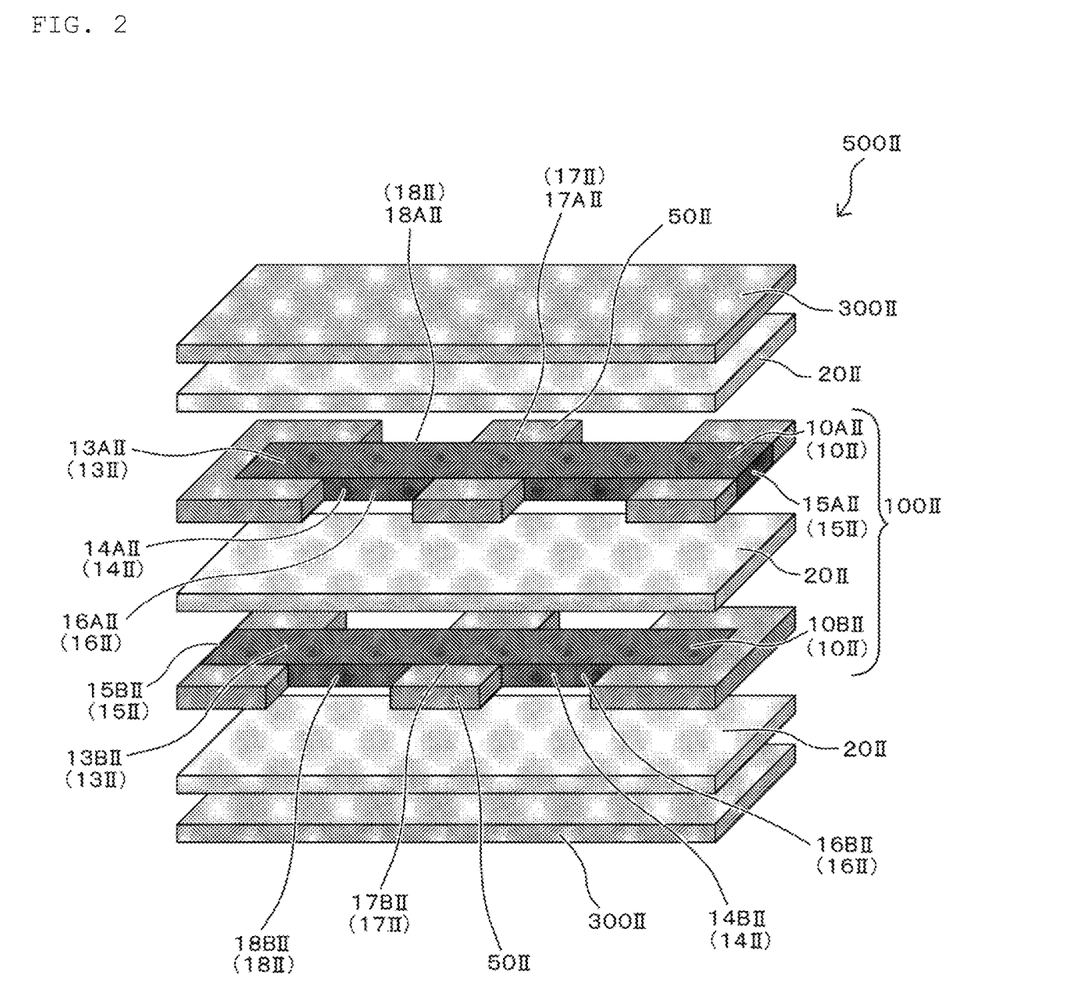
FIG. 2 is an exploded perspective view schematically illustrating a solid-state battery according to an embodiment of the present invention.

In an aspect, at a terminal non-connection part 16II of an electrode layer 10II, a non-contact region 18II is preferably disposed between one contact region 17II and the other contact region 17II adjacent to each other (see FIG. 2). In FIG. 2, similar component parts to those shown and described with reference to FIG. 1 are labeled with a "II" in place of the "I". A description of these component parts, such as 13II (13AII and 13BII), 14II (14AII and 14BII). 300II, 20II, 100II, is the same as those set forth herein in connection with the corresponding component part of FIG. 1.

In an embodiment of the present invention, an insulating part or a solid electrolyte part 50II surrounds the terminal non-connection part 16II of the electrode layer 10II. The insulating part or the solid electrolyte part 50II also has an advantage of being capable of protecting the electrode layer 10II and ensuring the electronic insulation property. Accordingly, it is preferable to protect the electrode layer and ensure the electronic insulation property while achieving the function effect of stress relaxation with the introduction of the non-contact region 18II at the terminal non-connection part 16II. From such a point of view, the non-contact region 18II is preferably disposed between one contact region 17II and the other contact region 17II adjacent to each other.

In an aspect, it is preferable that at least two non-contact regions are spaced apart at a predetermined interval (see FIG. 1).

As described above, according to an embodiment of the present invention, the terminal non-connection part 16I of the side part 14I of the electrode layer 10I can include the contact region 17I in direct contact with the insulating part or the solid electrolyte part 50I, and the non-contact region 18I out of direct contact with the insulating part or the solid electrolyte part 50II. The non-contact region 18I can contribute to the reduced range of contact between the terminal non-connection part 16I of the side part 14I of the electrode layer 10I and the insulating part or solid electrolyte part 50I. From the viewpoint of increasing the contribution to the reduced range of contact, it is preferable to increase the number of non-contact regions 18I.

Specifically, the number of the non-contact regions 18I is not limited to one, and is preferably at least two (two or more) (see FIG. 1). Thus, the range of contact between the terminal non-connection part 16I and the insulating part or solid electrolyte part 50I can be further reduced as compared with the case where the number of non-contact regions is one. As a result, the extent in which stress can be generated on the insulating part or solid electrolyte part 50I with a low degree of expansion due to the active material layer with a high degree of expansion is allowed to be reduced.

In an aspect, in the foregoing, the at least two non-contact regions 18II are more preferably regularly arranged (see FIG. 2).

As can be seen from the foregoing description, when the at least two non-contact regions 18II are spaced apart at a predetermined interval, the range of contact between the terminal non-connection part 16II and the insulating part or solid electrolyte part 50II can be further reduced as compared with the case where the number of the non-contact regions is one.

In this regard, at the terminal non-connection part 16II, when at least two non-contact regions 18II that are constituent elements of the terminal non-connection part 16II are regularly arranged, the contact regions 17II will be also regularly arranged accordingly. Thus, it is possible to regularly provide a site where stress can be generated on the insulating part or solid electrolyte part 50II, and a site where the stress is not generated or hardly generated.

As a result, sites where stress can be generated on the insulating part or solid electrolyte part 50II can be prevented from being unevenly distributed at a specific site, that is, a so-called uneven distribution of stress generation sites can be prevented. As a result, as a whole, the relaxation of the stress can be uniformly balanced. Accordingly, cracks can be more suitably prevented from being generated at the time of charging of a solid-state battery 500II.

In an aspect, in the foregoing, at least two non-contact regions 18II are preferably disposed to face each other in planar view (see FIG. 2).

As described above, when the at least two non-contact regions 18II are spaced apart at a predetermined interval, the range of contact between the terminal non-connection part 16II and the insulating part or solid electrolyte part 50II can be further reduced as compared with the case where the number of the non-contact regions is one.

In this regard, at the terminal non-connection part 16II, when at least two non-contact regions 18II that are constituent elements of the terminal non-connection part 16II are arranged to face each other in planar view, sites where stress is not generated or hardly generated on the insulating part or solid electrolyte part 50II can also be accordingly arranged to face each other. More specifically, this means that the stress relaxation sites face each other. As a result, as compared with a case where at least two non-contact regions 18II are arranged side by side on the same side at a predetermined interval, the stress relaxation sites are not unevenly distributed on one side. Thus, as a whole, the relaxation of the stress can be uniformly balanced. Accordingly, cracks can be more suitably prevented from being generated at the time of charging of a solid-state battery 500II.

In an aspect, on the premise that at least two non-contact regions 18II are disposed apart from each other, the contact region 17II in direct contact with the insulating part or the solid electrolyte part 50II and the non-contact regions 18II out of direct contact with the insulating part or the solid electrolyte part 50II are alternately disposed (see FIG. 2).

As can be seen from the foregoing description, when the at least two non-contact regions 18II are spaced apart at a predetermined interval, the range of contact between the terminal non-connection part 16II and the insulating part or solid electrolyte part 50II can be further reduced as compared with the case where the number of the non-contact regions is one.

In this regard, as the number of non-contact regions 18II is increased, the range of contact between the terminal non-connection part 16II and the insulating part or solid electrolyte part 50II can be further reduced, which can contribute to the overall stress relaxation, but is not considered necessarily good from the viewpoints of protecting the electrode layer and ensuring the electronic insulation property. Then, the contact region 17II and the non-contact region 18II are alternately arranged, thereby securing a predetermined number/amount of contact regions 17II, and securing the insulating part or solid electrolyte part 50II in a discontinuous form in planar view. Thus, as a whole, it is possible to more suitably achieve a balance between: (1) stress relaxation; and (2) protecting the electrode layer and (3) ensuring the electronic insulation property.

Similarly, from the viewpoint of suitably achieving a balance between: stress relaxation; and protecting the electrode layer and securing of electronic insulation property, the proportion of the non-contact region 18II to the terminal non-connection part 16II is preferably limited to a predetermined range, thereby also securing the contact region 17II to a certain extent. From such a viewpoint, the ratio of the area of the non-contact region 18II out of direct contact with the insulating part or solid electrolyte part 50II to the total area of the terminal non-connection part 16II can be 0.05 to 0.3. Thus, the extent of the non-contact region 18II is limited, and the contact region 17II can also be secured to a certain extent, and thus, the protection of the electrode layer and the electronic insulation property can be suitably ensured.

Figure 3:
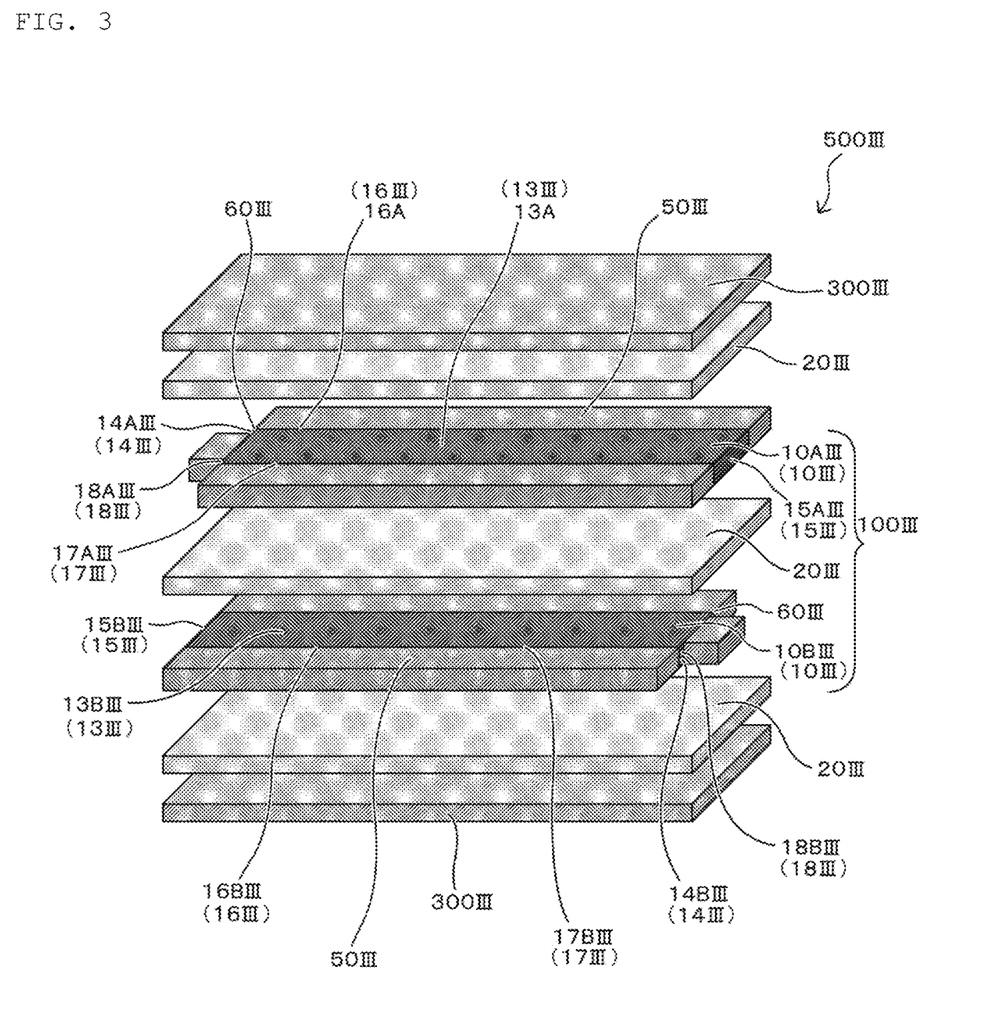
FIG. 3 is an exploded perspective view schematically illustrating a solid-state battery according to an embodiment of the present invention.

In an aspect, the non-contact regions 18I and 18III are preferably provided at corner parts 60I and 60III of the electrode layers 10I and 10III in planar view (see FIGS. 1 and 3). In FIG. 3, similar component parts to those shown and described with reference to FIG. 1 are labeled with a "III" in place of the "I". A description of these component parts, such as 13III (13AIII and 13BIII), 14III (14AIII and 14BIII), 300III, 20III, 100III, is the same as those set forth herein in connection with the corresponding component part of FIG. 1.

When stress is generated because the insulating part or the solid electrolyte part is not greatly elongated with respect to the elongation of the expansion of the electrode layer at the time of charging the battery, sites where the stress is likely to concentrate may be corner parts of the electrode layers 10I and 10III or the vicinities thereof where the stress is most unlikely to be dispersed due to the bent form in planar view. From such a viewpoint, the non-contact regions 18I and 18III are preferably provided at the corner parts 60I and 60III of the electrode layers 10I and 10III. Thus, there will be no insulating part or solid electrolyte part disposed so as to surround the corner parts of the electrode layers where stress is likely to concentrate. As a result, as a whole, stress itself that can be generated on the insulating part or the solid electrolyte part can be more suitably alleviated. Accordingly, cracks can be more suitably prevented from being generated at the time of charging of the solid-state battery 500I or 500III.

[Method for Manufacturing Solid-State Battery According to Present Invention]

A method for manufacturing the solid-state battery according to an embodiment of the present invention will be described below. It is to be noted that the present manufacturing method is considered by way of example only, and the fact that any case of using another method (screen printing method or the like) is not excluded is mentioned in advance.

The solid-state battery according to an embodiment of the present invention can be produced by using a green sheet method mainly with a green sheet used. In an aspect, with a predetermined laminated body formed by a green sheet method, the solid-state battery according to an embodiment of the present invention can be then finally manufactured. It is to be noted that on the premise of this aspect, the method will be described below, but not limited thereto, and a predetermined laminated body may be formed by a screen printing method or the like.

(Step of Forming Unfired Laminated Body)

First, each substrate (for example, a PET film) is coated with a solid electrolyte layer paste, a positive electrode active material layer paste, a positive electrode current collector layer paste, a negative electrode active material layer paste, a negative electrode current collector layer paste, an insulating part paste, and a protective layer paste.

Each paste can be prepared by wet-mixing a predetermined constituent material for each layer appropriately selected from the group consisting of a positive electrode active material, a negative electrode active material, a conductive material, a solid electrolyte material, an insulating material, and a sintering aid with an organic vehicle that has an organic material dissolved in a solvent. The positive electrode active material layer paste includes, for example, a positive electrode active material, a conductive material, a solid electrolyte material, an organic material, and a solvent. The negative electrode active material layer paste includes, for example, a negative electrode active material, a conductive material, a solid electrolyte material, an organic material, and a solvent. The positive electrode current collector layer paste/negative electrode current collector layer paste may have, for example, at least one selected from the group consisting of silver, palladium, gold, platinum, aluminum, copper, and nickel. The solid electrolyte layer paste includes, for example, a solid electrolyte material, a sintering aid, an organic material, and a solvent. The protective layer paste includes, for example, an insulating material, an organic material, and a solvent. The insulating part paste includes, for example, an insulating material, an organic material, and a solvent.

In the wet mixing, a medium can be used, and specifically, a ball mill method, a Viscomill method, or the like can be used. In contrast, a wet mixing method without using a medium may be used, and a sand mill method, a high-pressure homogenizer method, a kneader dispersion method, or the like can be used.

A predetermined solid electrolyte layer paste can be prepared by wet-mixing a predetermined solid electrolyte material, a sintering aid, and an organic vehicle that has an organic material dissolved in a solvent. Further, as described already, examples of the solid electrolyte include lithium-containing phosphate compounds that have a NASICON structure, oxides that have a perovskite structure, and oxides that have a garnet-type or garnet-type similar structure. The lithium-containing phosphate compounds that have a NASICON structure include $Li_xM_y(PO_4)_3$ ($1 \le x \le 2$, $1 \le y \le 2$, M represents at least one selected from the group consisting of Ti, Ge, Al, Ga, and Zr). Examples of the lithium-containing phosphate compounds that have a NASICON structure include $Li_{1.2}Al_{0.2}Ti_{1.8}(PO_4)_3$. Examples of the oxides that have a perovskite structure include $La_{0.55}Li_{0.35}TiO_3$. Examples of the oxides that have a garnet-type or garnet-type similar structure include $Li_7La_3Zr_2O_{12}$.

As the positive electrode active material included in the positive electrode active material layer paste, at least one is selected from the group consisting of lithium-containing phosphate compounds that have a NASICON-type structure, lithium-containing phosphate compounds that have an olivine-type structure, lithium-containing layered oxides, and lithium-containing oxides that have a spinel-type structure.

The insulating material included in the insulating portion paste can be made of, for example, a glass material, a ceramic material, or the like. As the insulating material included in the protective layer paste, for example, it is preferable to use at least one selected from the group consisting of a glass material, a ceramic material, a thermosetting resin material, a photocurable resin material, and the like.

The organic material included in the paste is not particularly limited, but at least one polymer material selected from the group consisting of a polyvinyl acetal resin, a cellulose resin, a polyacrylic resin, a polyurethane resin, a polyvinyl acetate resin, a polyvinyl alcohol resin, and the like can be used. The solvent is not particularly limited as long as the organic material can be dissolved therein, and for example, toluene and/or ethanol can be used.

As the negative electrode active material included in the negative electrode active material layer paste, at least one is selected from the group consisting of, for example, oxides containing at least one element selected from the group consisting of Ti, Si, Sn, Cr, Fe, Nb, and Mo, graphite-lithium compounds, lithium alloys, lithium-containing phosphate compounds that have a NASICON-type structure, lithium-containing phosphate compounds that have an olivine-type structure, lithium-containing oxides that have a spinel-type structure, and the like.

The sintering aid can be at least one selected from the group consisting of lithium oxides, sodium oxides, potassium oxides, boron oxides, and silicon oxides.

The applied pastes are dried on a hot plate heated to 30° C. to 50° C. to form a solid electrolyte layer sheet, a positive electrode layer sheet, and a negative electrode layer sheet with predetermined thicknesses respectively on the substrates (for example, a PET film).

Next, each sheet is peeled off from the substrate. After the peeling, the sheets for the respective constituent elements of the battery constituent unit are sequentially stacked in the stacking direction.

In the stacking step, a solid electrolyte part sheet or an insulating part sheet is provided by screen printing in a side region of the electrode sheet. Specifically, the solid electrolyte part sheet or the insulating part sheet is provided so as to surround a terminal non-connection part of the side part of the electrode sheet excluding a part to which a terminal is connected later. In particular, in an embodiment of the present invention, the solid electrolyte part sheet or the insulating part sheet is provided by screen printing such that a part of the terminal non-connection part of the outer edge of the electrode sheet is brought into direct contact with the solid electrolyte part sheet or the insulating part sheet, whereas the other part thereof is not brought into contact with the solid electrolyte part sheet or the insulating part sheet.

It is then preferable to perform thermal compression bonding at a predetermined pressure (for example, from about 50 MPa to about 100 MPa) followed by isostatic press at a predetermined pressure (for example, from about 150 MPa to about 300 MPa). As described above, a predetermined laminated body can be formed.

(Firing Step)

The predetermined laminated body obtained is subjected to firing. The firing is performed by heating at, for example, 600° C. to 1000° C. in a nitrogen gas atmosphere.

Then, terminals are attached to the obtained laminated body. The terminals are provided so as to be electrically connectable respectively to the positive electrode layer and the negative electrode layer. For example, the terminals are preferably formed by sputtering or the like. Although not particularly limited, the terminals are preferably made of at least one selected from silver, gold, platinum, aluminum, copper, tin, and nickel.

Furthermore, a protective layer is preferably provided by sputtering, spray coating, or the like to such an extent that the terminals are not covered.

As described above, the solid-state battery according to one embodiment of the present invention can be suitably manufactured.

In the obtained solid-state battery according to an embodiment of the present invention, a region with the insulating part or the solid electrolyte part out of direct contact with the active material layer as a constituent element of the electrode layer at the terminal non-connection part can be provided as compared with a case where conventionally, the terminal non-connection part of the side part of the electrode layer is all surrounded by the insulating part or the solid electrolyte part, with the terminal non-connection part in contact with the insulating part or the solid electrolyte part in planar view.

Thus, as compared with the conventional configuration mentioned above, the range of contact can be reduced between the electrode layer including the active material layer with a high degree of expansion and the insulating part or solid electrolyte part with a low degree of expansion. Thus, it is possible to provide a site where stress can be generated on the insulating part or solid electrolyte part with a low degree of expansion due to the active material layer with a high degree of expansion, and a site where the stress is not generated or hardly generated, as compared with a case where the terminal non-connection part of the side part of the electrode layer is all surrounded by the insulating part or the solid electrolyte part in planar view.

As a result, the extent in which stress can be generated on the insulating part or solid electrolyte part with a low degree of expansion due to the active material layer with a high degree of expansion can be reduced as compared with the conventional configuration mentioned above. The reduced extent of stress generation can reduce, as a whole, alleviate stress itself that can be generated on the insulating part or solid electrolyte part with a low degree of expansion due to the active material layer with a high degree of expansion, as compared with the conventional configuration mentioned above. Accordingly, cracks can be suitably prevented from being generated at the time of charging of a solid-state battery.

While an embodiment of the present invention has been described above, a typical example in the applicable scope of the present invention has been merely provided. Accordingly, the present invention is not limited thereto, and those skilled in the art will readily understand that various modifications can be made.

The solid-state battery according to an embodiment of the present invention can be used in various fields in which electric storage is expected. By way of example only, the solid-state battery according to an embodiment of the present invention can be used in electric, information, and communication fields (for example, the fields of mobile devices such as cellular phones, smartphones, smartwatches, lap-top computers, digital cameras, activity meters, arm computers, and electronic papers) in which a mobile device or the like is used, home and small-size industrial applications (for example, the fields of electric tools, golf carts, domestic and nursing care, and industrial robots), large-size industrial applications (for example, the fields of forklifts, elevators, harbor cranes), transportation system fields (for example, fields such as hybrid vehicles, electric vehicles, buses, trains, power-assisted bicycles, and electric motorcycles), electric power system applications (for example, fields such as various types of electric power generation, load conditioners, smart grids, general household installation-type electric storage systems), medical applications (fields of medical device such as earphone hearing aids), pharmaceutical applications (fields such as dosage management systems), IoT fields, space and deep-sea applications (for example, fields such as spacecraft and submersible research vehicles), and the like.

DESCRIPTION OF REFERENCE SYMBOLS 10I, 10II, 10III: Electrode layer
10AI, 10AII, 10AIII, 10A': Positive electrode layer
10BI, 10BII, 10BIII, 10B': Negative electrode layer
12A': Positive electrode active material layer
12B': Negative electrode active material layer
14I, 14II, 14III: Side part of electrode layer
14AI, 14AII, 14AIII: Side part of positive electrode layer
14BI, 14BII, 14BIII: Side part of negative electrode layer
15I, 15II, 15III: Electrode terminal connection part
15AI, 15AII, 15AIII: Positive electrode terminal connection part
15BI, 15BII, 15BIII: Negative electrode terminal connection part
16I, 16II, 16III: Electrode terminal non-connection part
16AI, 16AII, 16AIII: Positive electrode terminal non-connection part
16BI, 16BII, 16BIII: Negative electrode terminal non-connection part
17I, 17II, 17III: Contact region in direct contact with insulating part or solid electrolyte part as constituent element of electrode terminal non-connection part
17AI, 17AII, 17AIII: Contact region in direct contact with insulating part or solid electrolyte part as constituent element of positive electrode terminal non-connection part
17BI, 17BII, 17BIII: Contact region in direct contact with insulating part or solid electrolyte part as constituent element of negative electrode terminal non-connection part 18I, 18II, 18III: Non-contact region out of direct contact with insulating part or solid electrolyte part as constituent element of electrode terminal non-connection part 18AI, 18AII, 18AIII: Non-contact region out of direct contact with insulating part or solid electrolyte part as constituent element of positive electrode terminal non-connection part 18BI, 18BII, 18BIII: Non-contact region out of direct contact with insulating part or solid electrolyte part as constituent element of negative electrode terminal non-connection part 20I, 20II, 20III, 20': Solid electrolyte layer 30': Side part of electrode layer 40': Crack 50I, 50II, 50III: Insulating part or solid electrolyte part 100I, 100II, 100III, 100': Battery constituent unit 200A': Positive electrode terminal 200B': Negative electrode terminal 300I, 300II, 300III: Exterior 500I, 500II, 500III, 500': Solid-state battery

The invention claimed is:

1. A solid-state battery comprising:
at least one battery constituent unit including a positive electrode layer, a negative electrode layer, and a solid electrolyte layer interposed between the positive electrode layer and the negative electrode layer,
wherein each of the positive electrode layer and the negative electrode layer includes at least an active material layer, and includes a side part having a terminal connection part and a terminal non-connection part; and
an insulating part or a solid electrolyte part surrounding at least a part of the terminal non-connection part of at least one of the positive electrode layer and the negative electrode layer in a planar view of the at least one battery constituent unit in a laminating direction of the positive electrode layer, the negative electrode layer, and the solid electrolyte layer such that the insulating part or the solid electrolyte part is in direct contact with the terminal non-connection part in a contact region and out of direct contact with the terminal non-connection part in a non-contact region.

2. The solid-state battery according to claim 1, wherein the insulating part or the solid electrolyte part surrounds at least a part of the terminal non-connection part of both of the positive electrode layer and the negative electrode layer.

3. The solid-state battery according to claim 1, wherein at least two of the insulating parts or the solid electrolyte parts separated from each other in the planar view surround the terminal non-connection part of the at least one of the positive electrode layer and the negative electrode layer.

4. The solid-state battery according to claim 1, wherein the insulating part or the solid electrolyte part surrounding the terminal non-connection part is discontinuous in the planar view.

5. The solid-state battery according to claim 1, wherein the insulating part or the solid electrolyte part is in direct contact with the terminal non-connection part in multiple contact regions and out of direct contact with the terminal non-connection part in multiple non-contact regions.

6. The solid-state battery according to claim 5, wherein at least two non-contact regions of the multiple non-contact regions are spaced apart at a predetermined interval.

7. The solid-state battery according to claim 6, wherein the at least two non-contact regions spaced apart at the predetermined interval are regularly arranged.

8. The solid-state battery according to claim 5, wherein at least two non-contact regions of the multiple non-contact regions face each other in the planar view.

9. The solid-state battery according to claim 1, wherein the insulating part or the solid electrolyte part is in direct contact with the terminal non-connection part in multiple contact regions.

10. The solid-state battery according to claim 9, wherein the non-contact region is disposed between adjacent contact regions of the multiple contact regions.

11. The solid-state battery according to claim 1, wherein the contact region and the non-contact region are alternately arranged.

12. The solid-state battery according to claim 1, wherein a ratio of an area of the non-contact region out of direct contact with the insulating part or the solid electrolyte part to a total area of the terminal non-connection part is 0.05 to 0.3.

13. The solid-state battery according to claim 1, wherein the non-contact region is located at a corner part of the electrode layer in the planar view.

14. The solid-state battery according to claim 1, wherein the positive electrode layer and the negative electrode layer are layers capable of occluding and releasing lithium ions.

15. The solid-state battery according to claim 1, wherein
each of the positive electrode layer and the negative electrode layer includes the side part having the terminal connection part and the terminal non-connection part, and
the insulating part or the solid electrolyte part surrounds the at least the part of the terminal non-connection part of both of the positive electrode layer and the negative electrode layer in the planar view of the at least one battery constituent unit in the laminating direction of the positive electrode layer, the negative electrode layer, and the solid electrolyte layer such that the insulating part or the solid electrolyte part is in direct contact with the terminal non-connection part in the contact region and out of direct contact with the terminal non-connection part in the non-contact region.

16. The solid-state battery according to claim 1, further comprising:
a positive electrode terminal electrically connected to the positive electrode layer and extending along the lamination direction of the positive electrode layer, the negative electrode layer, and the solid electrolyte layer; and
a negative electrode terminal electrically connected to the negative electrode layer and extending along the lamination direction of the positive electrode layer, the negative electrode layer, and the solid electrolyte layer.

* * * * *